(12) United States Patent
Ta et al.

(10) Patent No.: US 7,614,779 B2
(45) Date of Patent: Nov. 10, 2009

(54) KITCHEN APPLIANCE

(75) Inventors: Jing Ning Ta, Hong Kong (CN); Jie Tao, Shenzhen (CN)

(73) Assignee: Johnson Electric S.A., La Chaux-De-Fonds (CH)

( * ) Notice: Subject to any disclaimer, the term of this patent is extended or adjusted under 35 U.S.C. 154(b) by 312 days.

(21) Appl. No.: 11/812,738

(22) Filed: Jun. 21, 2007

(65) Prior Publication Data

US 2007/0297283 A1 Dec. 27, 2007

(30) Foreign Application Priority Data

Jun. 23, 2006 (CN) .................... 2006 1 0106473

(51) Int. Cl.
*A47J 43/044* (2006.01)
*A47J 43/08* (2006.01)

(52) U.S. Cl. ..................... 366/98; 366/197; 74/425; 74/458

(58) Field of Classification Search ........... 366/92–100, 366/197–207, 222–224; 74/724, 425, 458
See application file for complete search history.

(56) References Cited

U.S. PATENT DOCUMENTS

| 3,951,351 A | * | 4/1976 | Ernster et al. |
| 4,613,086 A | * | 9/1986 | Granum et al. |
| 4,697,929 A | * | 10/1987 | Muller |
| 7,306,362 B2 | * | 12/2007 | Lim et al. |
| 2009/0147618 A1 | * | 6/2009 | Kovacic et al. |

FOREIGN PATENT DOCUMENTS

| EP | 0 127 050 A3 | 5/1984 |
| EP | 0 712 197 A1 | 5/1996 |
| EP | 1870007 A2 * | 12/2007 |
| GB | 2 216 814 A | 10/1989 |
| WO | 2007/023102 A1 * | 3/2007 |

\* cited by examiner

*Primary Examiner*—Charles E Cooley
(74) *Attorney, Agent, or Firm*—Birch, Stewart, Kolasch & Birch, LLP

(57) ABSTRACT

A kitchen appliance in the form of a stand mixer has an electric motor driving a mixing implement via a gear box. The gear box includes a worm on a shaft mating with a worm gear to achieve speed reduction and a change in the axis of rotation.

13 Claims, 5 Drawing Sheets

KITCHEN APPLIANCE

CROSS-REFERENCE TO RELATED APPLICATIONS

This non-provisional patent application claims priority under 35 U.S.C. §119(a) from Patent Application No. 200610106473.5 filed in China on 23 Jun. 2006.

BACKGROUND OF THE INVENTION

This invention relates to a kitchen appliance and in particular, to a stand mixer of the type which is not held by hand.

A stand mixer is a kitchen appliance which is used for mixing dough, batters, cake mixes and the like and may incorporate a power take off for driving other kitchen type appliance attachments such as a blender or mincer. The mixer is generally too heavy to be held by hand in use and has a frame designed to sit on a kitchen bench or table. The mixer has an electric motor which drives the beating or mixing implements through a gear train. A gear train being a series of gears or cogs which change the speed or orientation of a rotation. Traditionally, the gear train of a stand mixer contains a worm on the shaft of the motor. The worm drives a worm gear which as well as changing speed also changes the orientation of rotation from a horizontal axis to a vertical axis. In order to mass produce these gears for the gear train, the worm gear is made as a straight sided helical gear. This type of gear assembly is known to be noisy and to overcome this noise, the gear train is heavily coated with grease and covered by a heavy or thick cover to absorb some of the noise. Recently, when high speed motors were used, additional gearing between the worm and the motor shaft was introduced to keep the worm speed as low as possible to reduce the audible noise.

However, the mixer is still noisy and as other kitchen appliances become quieter, there is a strong desire for a quieter stand mixer, especially in the heavy duty deluxe range where smaller high speed motors are used to drive implements through a higher speed reduction gear train to maintain or increase output torque with a lighter motor.

It has been discovered that the worm gear is still responsible for a substantial amount of noise from the gear train of a stand mixer. With this in mind, the present invention aims to reduce the gear train noise of a stand mixer by utilizing a stand mixer with a quieter worm gear assembly.

BRIEF SUMMARY OF THE INVENTION

Accordingly, the present invention provides a kitchen appliance in the form of a stand mixer, having: a stand; a motor chamber supported by the stand; a motor housed within the motor chamber; a gear train accommodated by the motor chamber and driven by the motor; an output shaft extending through the motor chamber for driving mixing implements, the output shaft being connected to the motor via the gear train to be driven thereby, wherein the gear train includes a worm one or more teeth in the form of a helical thread and arranged to drive a worm gear, characterized in that the worm gear is a half arc helical gear.

Preferably, the motor has a motor shaft arranged in use to extend horizontally and the output shaft is arranged in use to extend vertically and the worm and worm gear interface changes the orientation of rotation from horizontal to vertical.

Preferably, the worm is provided on the motor shaft.

Preferably, the worm is integrally formed with the motor shaft.

Preferably, the worm gear is a simple molding.

Preferably, the worm gear is of plastics material or of a bronze material.

Preferably, the output shaft is driven by the worm gear through step down gears.

Preferably, the output shaft drives a power takeoff shaft through bevel gears.

Preferably, the worm gear is disc like and has a plurality of teeth formed on a radially outer peripheral surface, each tooth having a first portion, a third portion of greater radial extent than the first portion and a second portion connecting the first portion to the third portion.

Preferably, the second portion of the teeth of the worm gear follow a shape to mate with teeth of the worm.

Preferably, the output shaft drives the implements through an orbital adapter.

Preferably, the gear train is housed within a gearbox fitted within the motor chamber.

BRIEF DESCRIPTION OF THE DRAWINGS

One preferred embodiment of the invention will now be described, by way of example only, with reference to the accompanying drawings, in which.

DETAILED DESCRIPTION OF THE PREFERRED EMBODIMENTS

Figure 1:
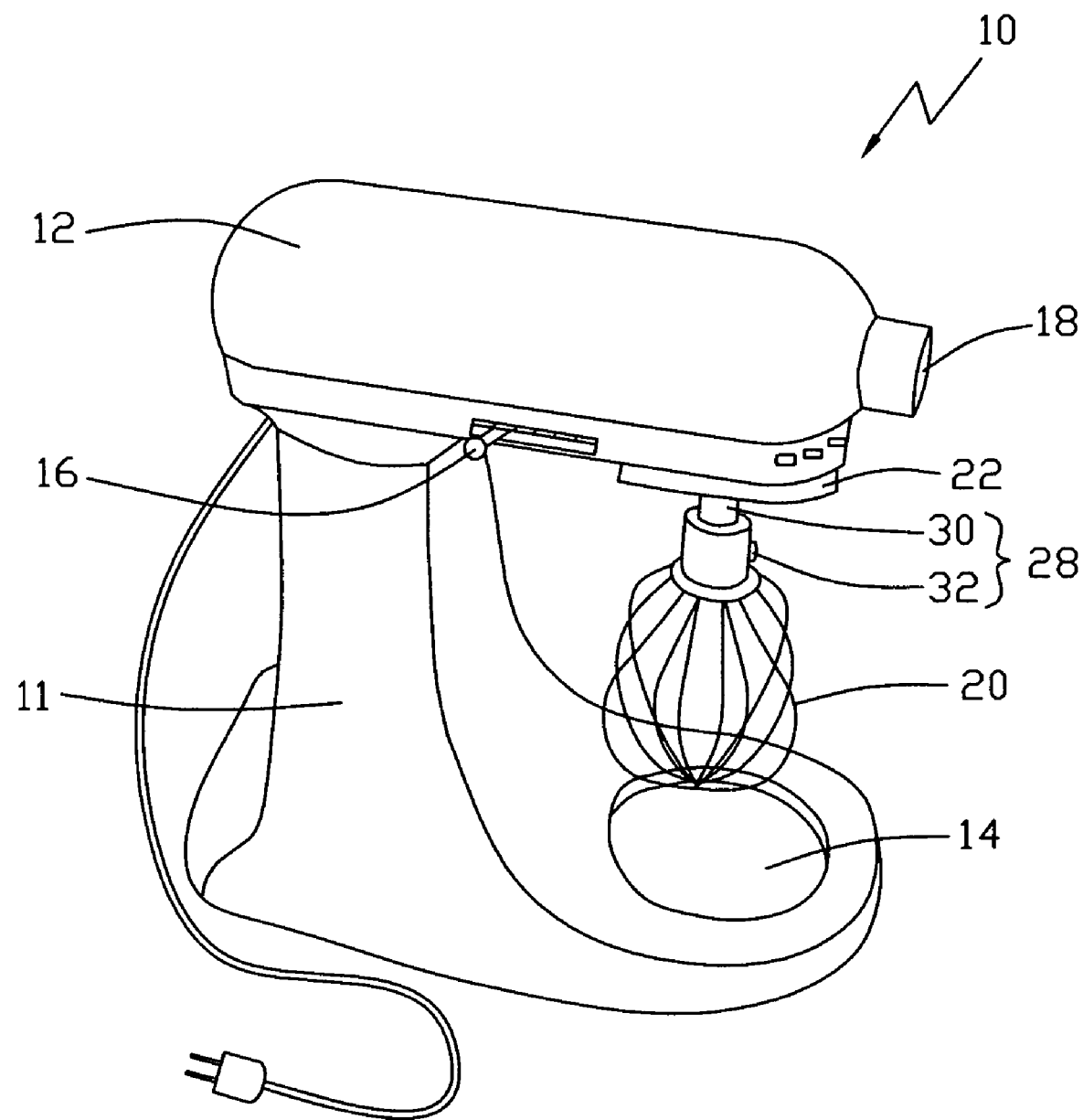
FIG. 1 is a perspective view of a stand mixer.

The kitchen appliance of FIG. 1 is a stand mixer 10, designed to sit on a table or bench top when being used. The stand mixer has a stand 11 which supports, on its upper end, a motor chamber 12. The stand also provides a seat or area 14 for a mixing bowl. A lever 16 which controls operation of the appliance is shown extending from one side of the motor chamber 12. The lever 16 is operable to slide along a slot in the motor chamber to change the speed of the appliance. A power take off 18 is shown extending horizontally from the front of the motor chamber 12. This allows accessories to be driven by the mixer.

A mixing implement in the form of a wire whisk 20 is shown extending downwardly from a front lower surface of the chamber 12 towards the mixing bowl seat 14. The implement is connected to the mixer by way of an orbital adapter 22 driven by an output shaft 44 of the mixer. The orbital adapter 22 drives the whisk 20 in a circle while rotating the whisk to give a thorough mixing of the ingredients in the mixing bowl. Use of an orbital adapter is optional and reduces the need to rotate the mixing bowl.

Figure 2:
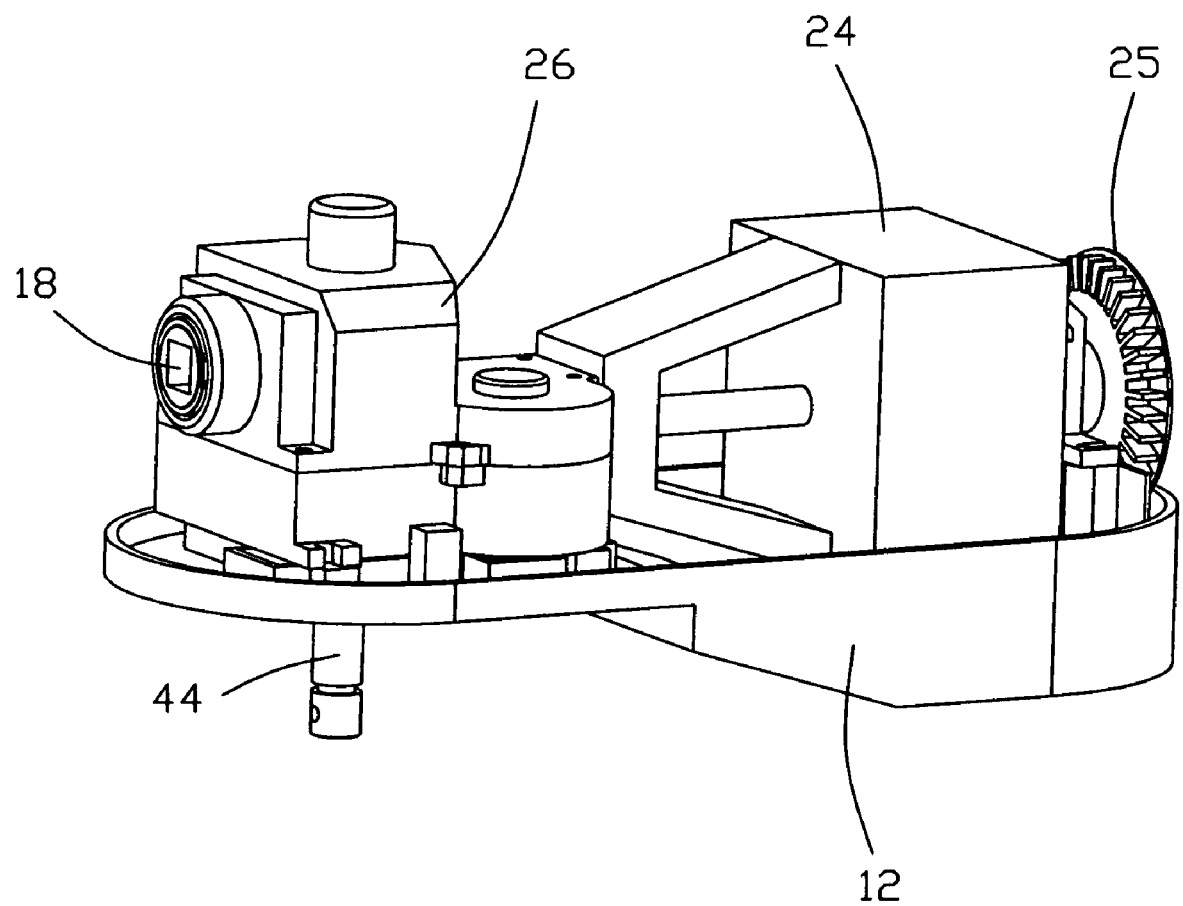
FIG. 2 is a view of a portion of the stand mixer of FIG. 1 with a cover removed showing a motor and gear box.
Figure 3:
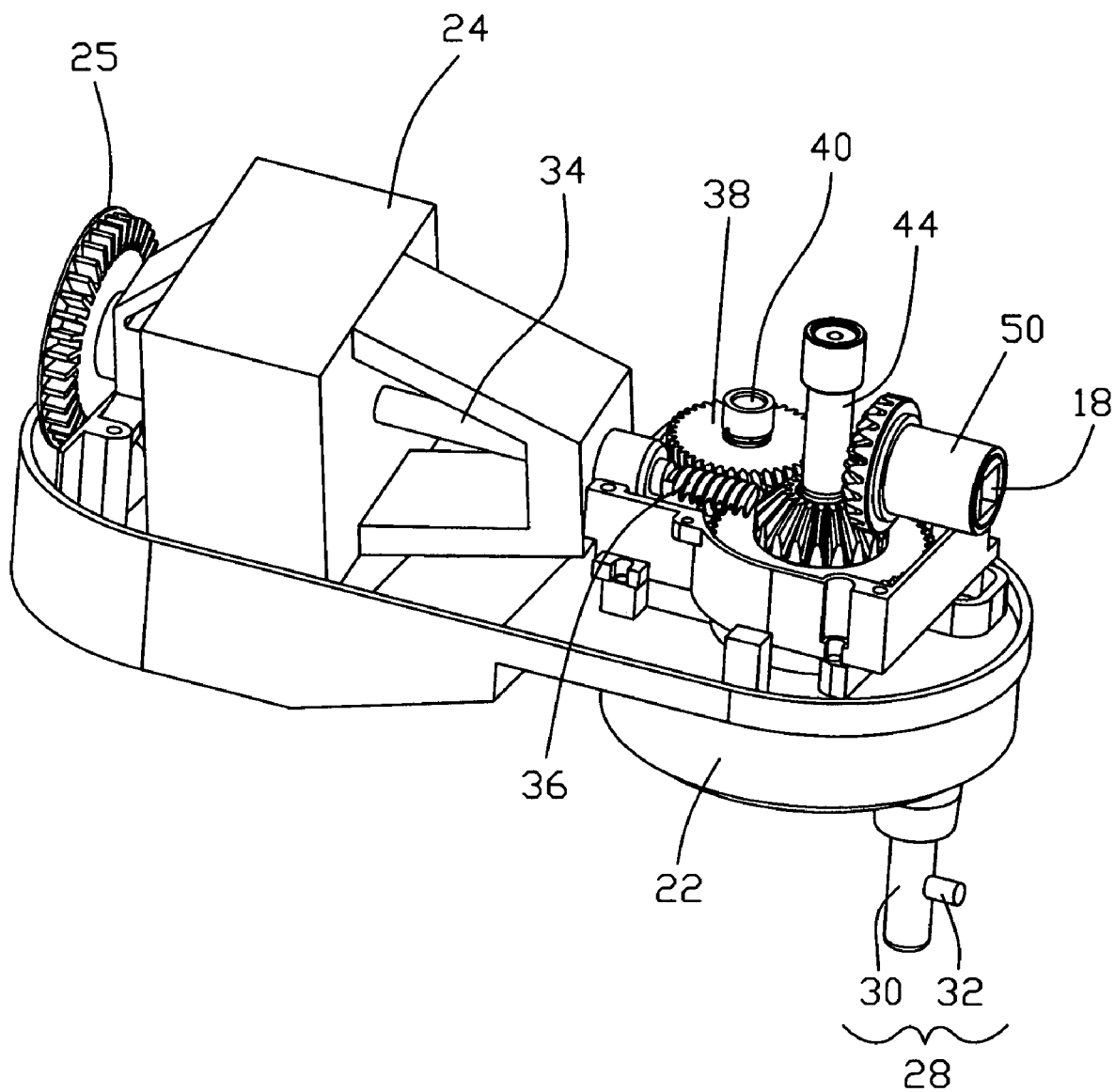
FIG. 3 is a view of the gear box of FIG. 2 with a cover removed to show the gear train.

Inside the motor chamber 12 is a motor 24 and a gear box 26 as shown in FIG. 2. Also visible is a fan 25 fitted to motor shaft 34 for cooling the motor. Power take off 18 is visible at the front of the gear box 16. In FIG. 2, an orbital adapter is not used and the output shaft 44 is visible extending below motor chamber 12 for direct driving attachment to mixer implements. In FIG. 3, the orbital adapter 22 is fitted and visible beneath the gear box 26 and showing a drive spigot 28 for the implements. A simple form for the spigot 28 is a round shaft 30 with a transverse pin 32 which fits a bayonet type connection on the implement.

Figure 4:
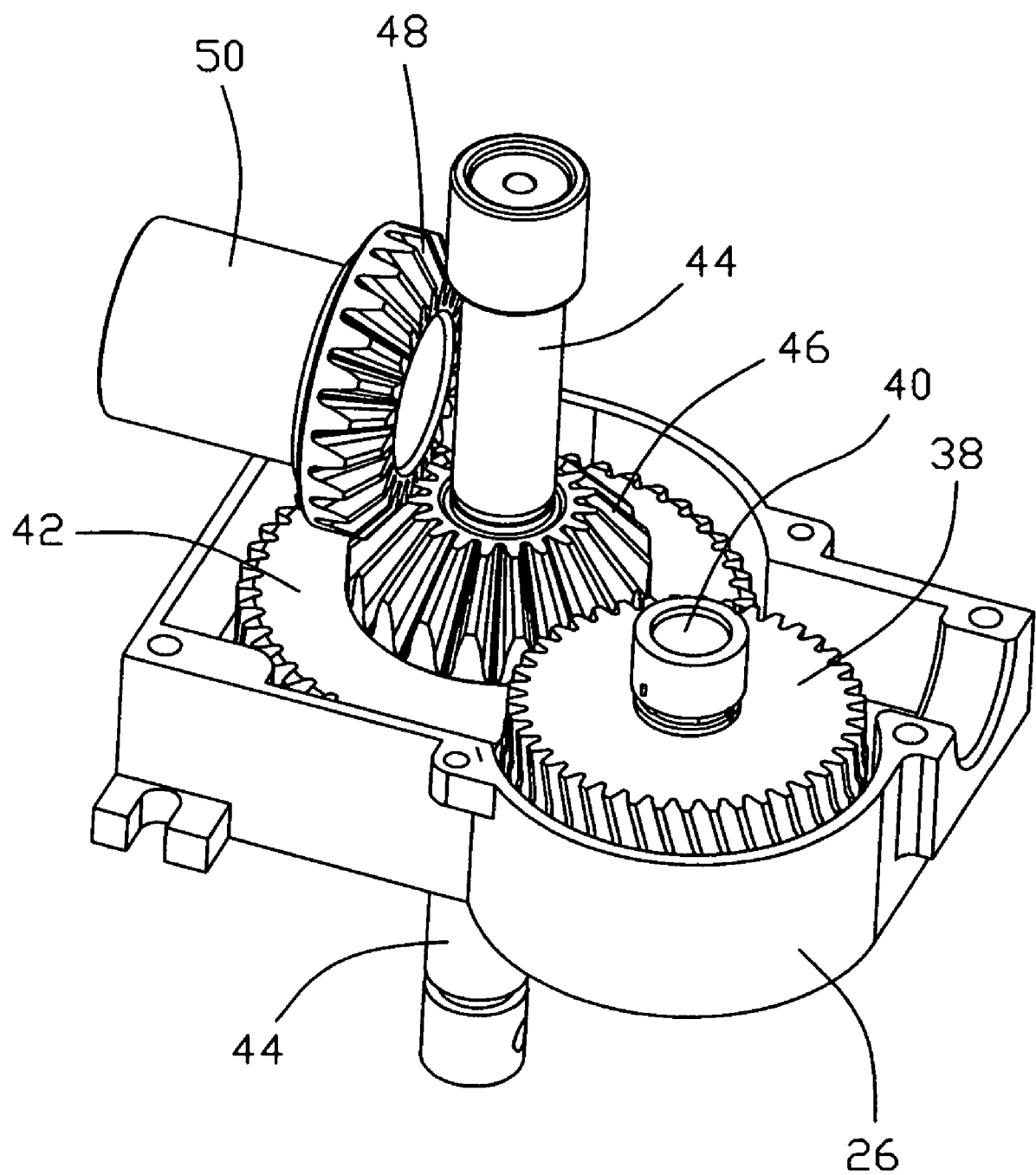
FIG. 4 is a perspective view of the gear train of FIG. 3, without the motor, viewed from the opposite side.

The gear train is more clearly shown in FIGS. 3 and 4 which show the gear box 24 with a top cover removed.

The motor 24 is mounted horizontally in the chamber 12 such that the motor shaft 34 extends horizontally. Motor shaft 34 is provided with a worm 36. In this embodiment, the worm 36 is integrally formed with the motor shaft 34, although a separate worm cog could be pressed on and/or keyed to the shaft. The worm 38 has one or more teeth in the form of a helical thread. The worm 36 is directly engaged or meshed with a worm gear 38 which is mounted for rotation about a vertical axis and is pressed onto or otherwise mounted and keyed to an idler axle 40 for rotation therewith.

Mounted to the idler axle 40 below the worm gear 38 is an idler gear (not shown) which engages a driven cog 42 fitted to an output shaft 44 for rotation therewith. A bevel gear 46 is similarly mounted to the output shaft 44 above the driven cog 42 and meshes with a bevel gear 48 on a shaft 50 of the power take off 18.

The output shaft 44 extends through the bottom of the gear box 26 and chamber 12 to drive the implements directly or, as shown in the preferred embodiment, to drive the implements via the orbital adapter 22. The orbital adapter 22 may or may not be removably attached to the output shaft 44. The implements, such as the wire whisk 20 are connected to drive spigot 28 of the orbital adapter 22 in a quick connect manner, preferably by utilizing a radial pin 32 extending from the round shaft 30 and mating with a slot in the end of the implement in a bayonet type connection.

Figure 5:
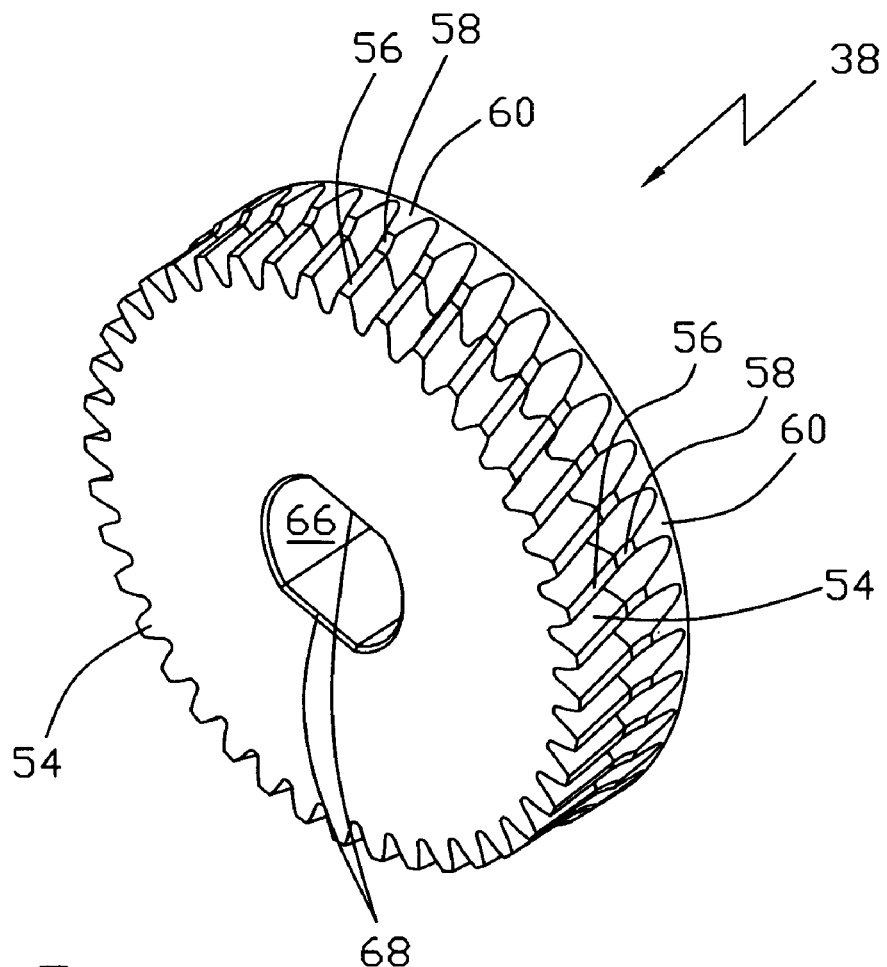
FIG. 5 is a perspective view of a worm gear being a part of the gear train of FIG. 3.

Worm gear 38 is shown in FIG. 5. The worm gear 38 is disc like in appearance with central hole 66 for mounting and a plurality of teeth 54 on the radially outer periphery. Mounting hole 66 is shown in FIG. 5, as being round with two diagonally opposite flat portions 68. These flat portions 68 key the worm gear 38 to the idler axle 40 to drive the idler gear. Worm gear 38 is different from a standard worm gear in that the teeth 54, although cut in the usual helix configuration, do not have a flat outer edge. Instead, the radially outer edges of the teeth 54 have a first portion 56 which is flat, a third portion 60 which is flat but has a greater radial extent than the first portion and a second portion 58, joining the first and third portions 56, 60. This second portion 58 is preferably curved or arcuate, as more clearly shown in FIG. 6.

Figure 6:
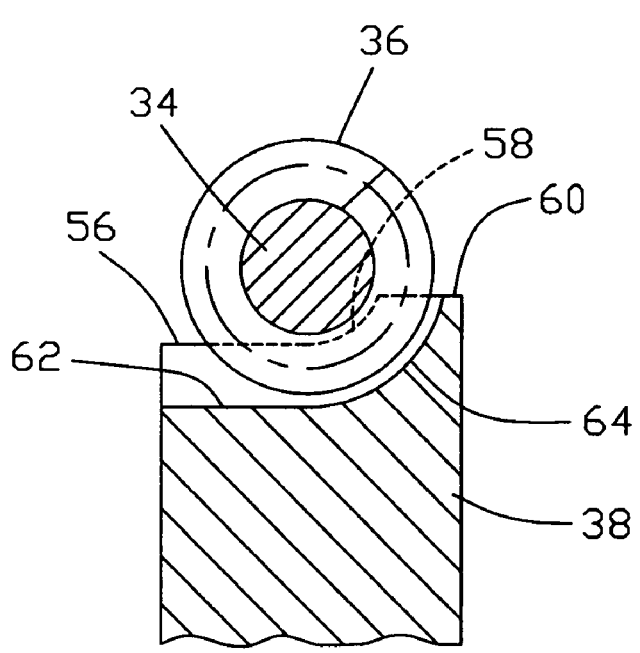
FIG. 6 is a schematic representation of the interface between a worm and the worm gear of FIG. 5.

The bottom of the teeth 54 also has a flat portion 62 and an arcuate portion 64 as shown in FIG. 6. The arcuate portion 64 follows the curve of the worm 36. The effect of this raised third portion 60 of the teeth is to provide a larger contact area between the worm 36 and the worm gear 38, increasing the load bearing strength of the interface and reducing the noise produced. The increase in strength allows the worm gear 38 to be made of a lower strength material such as plastic or cast bronze which generates less noise than the standard steel gears. FIG. 6, which is a sectional view through the worm/worm gear connection, also shows the sectional profile of the worm 36 and how it mates with the teeth 54 of the worm gear 38.

In this way, the size of the gear box is not increased to accommodate the worm gear which is quieter and cheaper.

The shape of the teeth of the worm gear has been termed half arc as it is half flat and half arcuate. A full arc helical gear does give greater strength, however to manufacture a full arc gear requires the gear, once cast, to be machined to produce the arc in the teeth as these cannot be molded due to the groove in the radially outer surface. Such post mold machining increases the part cost significantly. However, the half arc gear can be directly molded or cast with no secondary machining process as there are no hidden recesses preventing the gear from leaving the mold cleanly.

The present stand mixer has a significantly reduced noise level at all speeds of operation compared to a prior art stand mixer.

The table below tabulates test results on noise levels using a prior art stand mixer and modifying only the worm gear. Sample 1 uses a modified gear box with a plastic half arc worm gear. Sample 2 uses a modified gear box with a bronze half arc worm gear and PA is the mixer using the unmodified gear box of the prior art.

TABLE 1

| Speed Setting | Speed RPM | Sample 1 dBA | Sample 2 dBA | PA dBA |
|---|---|---|---|---|
| 1 | 2,300 | 55.8 | 59.6 | 68.7 |
| 2 | 3,100 | 59.0 | 62.6 | 70.9 |
| 3 | 4,600 | 63.7 | 65.7 | 75.2 |
| 4 | 6,000 | 67.9 | 68.5 | 77.1 |
| 5 | 7,100 | 67.9 | 72.0 | 78.0 |
| 6 | 7,800 | 69.4 | 73.4 | 78.3 |
| 7 | 8,700 | 70.5 | 74.7 | 77.8 |
| 8 | 9,800 | 72.6 | 76.4 | 81.5 |
| 9 | 11,200 | 75.0 | 79.0 | 80.6 |
| 10 | 13,000 | 78.3 | 83.2 | 84.2 |

As can be seen, at all 10 speeds, both samples produced significantly less noise with most reduction noticeable in the low to mid range speeds.

The embodiment described above is given by way of example only and various modifications will be apparent to persons skilled in the art without departing from the scope of the invention as defined in the appended claims.

The invention claimed is:

1. A kitchen appliance in the form of a stand mixer, comprising:
a stand;
a motor chamber supported by the stand;
a motor housed within the motor chamber;
a gear train accommodated by the motor chamber and driven by the motor;
an output shaft extending through the motor chamber for driving mixing implements, the output shaft being connected to the motor via the gear train to be driven thereby,
wherein the gear train includes a worm having a number of teeth in the form of a helical thread and arranged to drive a worm gear, and
wherein the worm gear is a half arc helical gear.

2. The appliance of claim 1, wherein the motor has a motor shaft arranged in use to extend horizontally and the output shaft is arranged in use to extend vertically and the worm and worm gear interface changes the orientation of rotation from horizontal to vertical.

3. The appliance of claim 1, wherein the worm is provided on the motor shaft.

4. The appliance of claim 3, wherein the worm is integrally formed with the motor shaft.

5. The appliance of claim 1, wherein the worm gear is a simple molding.

6. The appliance of claim 5, wherein the worm gear is of plastics material.

7. The appliance of claim 5, wherein the worm gear is of a bronze material.

8. The appliance of claim 1, wherein the output shaft is driven by the worm gear through step down gears.

9. The appliance of claim 1, wherein the output shaft drives a power takeoff shaft through bevel gears.

10. The appliance of claim 1, wherein the worm gear is disc like and has a plurality of teeth formed on a radially outer peripheral surface, each tooth having a first portion, a third portion of greater radial extent than the first portion and a second portion connecting the first portion to the third portion.

11. The appliance of claim 10, wherein the second portion of the teeth of the worm gear follow a shape to mate with teeth of the worm.

12. The appliance of claim 1, wherein the output shaft drives the implements through an orbital adapter.

13. The appliance of claim 1, wherein the gear train is housed within a gearbox fitted within the motor chamber.

* * * * *